No. 733,797.

Patented July 14, 1903.

UNITED STATES PATENT OFFICE.

FRITZ BASENAU AND ALI COHEN, OF AMSTERDAM, NETHERLANDS.

PROCESS OF PRODUCING INSULATING MEDIUMS.

SPECIFICATION forming part of Letters Patent No. 733,797, dated July 14, 1903.

Application filed August 4, 1902. Serial No. 118,369. (No specimens.)

*To all whom it may concern:*

Be it known that we, FRITZ BASENAU, physician, and ALI COHEN, merchant, subjects of the Queen of the Netherlands, and residents of Amsterdam, Netherlands, have invented a certain new and useful Process for the Production of an Insulating Medium, (for which we have applied for a patent in Germany on the 19th of March, 1902; in Austria on the 24th of March, 1902; in Belgium on the 29th of March, 1902; in Italy on the 1st of April, 1902; in Hungary on the 2d of April, 1902; in France on the 4th of April, 1902; in Great Britain on the 7th of April, 1902, and in Russia on the 29th of March, 1902,) of which the following is a specification.

The electric insulating compositions hitherto employed do not combine the insulating power, flexibility, and resistance to chemical influences which are desired for many purposes. We have found, however, that an excellent insulating medium may be produced mainly from asphalt and petroleum by the treatment hereinafter described. The relative quantities of purified asphalt and petroleum vary between seventy to thirty and forty to sixty, according to the special purpose in view.

An essential condition for the manufacture of the insulating medium forming the subject of the present invention is that the asphalt should be purified until all malodorous constituents, especially the volatile sulfur compounds, are removed; otherwise a good homogeneous and elastic insulating material cannot be obtained. For this purpose the asphalt is maintained for some days at a temperature exceeding its melting-point with the exclusion of air. For asphalt of the best quality it is sufficient to maintain a temperature of about 160° centigrade for about seventy-two hours. The asphalt treated in this manner is deep black, brilliant, and homogeneous and is now mixed with smaller or larger quantities of petroleum, according as a harder or a softer and more flexible material is to be produced. The asphalt is melted, the petroleum which has been raised to the same temperature is added, and subsequently while constantly stirring a solution of alumina hydrate in acetic acid obtainable by dissolving alumina hydrate equal in weight to about one per cent. of the asphalt and petroleum mixture in just enough acetic acid to effect the solution is added, and finally some colophony or other suitable resin and alkali. These additions cause a violent frothing of the whole mass, whereby the intimate mixture indispensable for the desired result is produced. Moreover, the addition of the aluminium aceticum imparts to the material great toughness, while the addition of resin and alkali renders the petroleum semisolid or gelatinous, which is necessary for the desired elasticity and consistency of the insulating medium. The weight of resin employed is about seven per cent. and the quantity of alkali about eight per cent. of the weight of the whole mass. The mass is now maintained in a decidedly liquid condition by heat while constantly stirring and subsequently allowed to cool.

The product obtained as described is jet black, softens already at a moderate temperature, (about 70° centigrade,) and hardens again rapidly on cooling. It is very flexible or ductile, and therefore very suitable for covering wires. It possesses a very high electrical resistance and is not attacked by strong hydrochloric or acetic acid, dilute nitric or sulfuric acid, ammonia, alkalies, and ordinary or salt water.

What we claim is—

1. The process for the production of an insulating medium, which consists in intimately mixing purified asphalt with petroleum and with a solution of aluminium aceticum, an alkali and resin, with the aid of heat, substantially as described.

2. The process for the production of an insulating medium, which consists in heating asphalt above its melting-point for several days with the exclusion of air, then mixing the molten asphalt with petroleum while constantly stirring, adding a solution of alumina hydrate in acetic acid, while constantly stirring, and subsequently adding alkali and resin simultaneously with the application of heat, substantially as described.

In witness whereof we have hereunto signed our names in the presence of the subscribing witnesses.

FRITZ BASENAU.
ALI COHEN.

Witnesses as to signature of Fritz Basenau:
AUGUST SIEGFRIED DOCEN,
PAUL STAAL.

Witnesses as to signature of Ali Cohen:
D. H. VAN NICROSS,
J. DE WILDE.